July 13, 1965 F. P. MASON 3,194,886

HALL EFFECT RECEIVER FOR MARK AND SPACE CODED SIGNALS

Filed Dec. 13, 1962 2 Sheets-Sheet 1

Inventor
FREDERICK P. MASON
By [signature]
Attorney

July 13, 1965 F. P. MASON 3,194,886

HALL EFFECT RECEIVER FOR MARK AND SPACE CODED SIGNALS

Filed Dec. 13, 1962 2 Sheets-Sheet 2

Inventor
FREDERICK P. MASON
By [signature]
Attorney 3,194,886

HALL EFFECT RECEIVER FOR MARK AND SPACE CODED SIGNALS

Frederick Percival Mason, Croydon, Surrey, England, assignor to Creed & Company Limited, Croydon, England, a British company
Filed Dec. 13, 1962, Ser. No. 244,366
Claims priority, application Great Britain, Dec. 22, 1961, 46,053/61
14 Claims. (Cl. 178—88)

This invention relates to an electronic switching device which simulates an electro-magnetic relay, and to a telegraph signal receiving arrangement using such a device.

An electronic device capable of simulating such a relay is desirable for use in electronic and semi-electronic telegraph apparatus for responding to incoming signals, although there are other applications for such a device. Accordingly it is an object of this invention to provide such a device. Characteristics which are desirable in such a device are the capability of providing electrical isolation between line and local circuits, and of effecting binary quantisation of incoming signals.

According to this invention there is provided an electronic relay arrangement, which comprises a Hall multiplier having a signal input via which direct current signals can be applied to its magnetising coil, an energising input which can be connected to a source of electrical energy so as to cause current flow in the member of Hall effect material in said multiplier, and a bistable device coupled to, and controlled by, the potential condition existing at the output terminals of said Hall effect member.

According to the present invention there is also provided an electrical telegraph signal receiving arrangement which comprises a Hall multiplier to the coil of which an incoming communication line can be connected, connections to the Hall effect member of said Hall multiplier via which a source of electrical energy may be connected thereto, so that two different electrical potential conditions may be set up at the output terminals of the Hall multiplier dependent on whether the incoming line is in the mark or in the space condition, and sampling means connected to said output terminals and arranged to sample the output derived from said Hall multiplier at or near the central point of each permutable element of a received code combination.

According to the present invention there is further provided an electrical telegraph signal receiving arrangement, which comprises a Hall effect multiplier whose coil can be influenced by the condition, mark or space, of an incoming communication circuit, connections from the Hall effect member of said multiplier to a source of an alternating potential whose frequency is high compared with the element repetition frequency of the telegraph signals to be dealt with, a connection from one of the output terminals of said Hall effect member to a reference potential (such as ground) and an output connection from the other output terminal of said Hall effect member, such that an alternating potential appears on said output connection when the line is in the mark condition but not when the line is in the space condition, a demodulator connected to said output connection, and a sampling gate connected to the output from said demodulator and adapted to be opened at or near to the midpoint of each permutable element of a code combination being dealt with, so that the output from said sampling gate is a direct current potential when the line is at mark and no direct current potential or a different direct current potential when the line is at space.

A Hall multiplier is a commercially available device which has a plate of a material exhibiting the Hall effect in which a current (direct or alternating) may be caused to flow. The device has a magnetising coil to which an incoming direct current may be applied to produce a potential condition at right angles to both the current and the field so produced by the coil. Output terminals are provided at which the potential so produced may be used.

The invention will now be described with reference to the accompanying drawings, in which.

Figure 1:
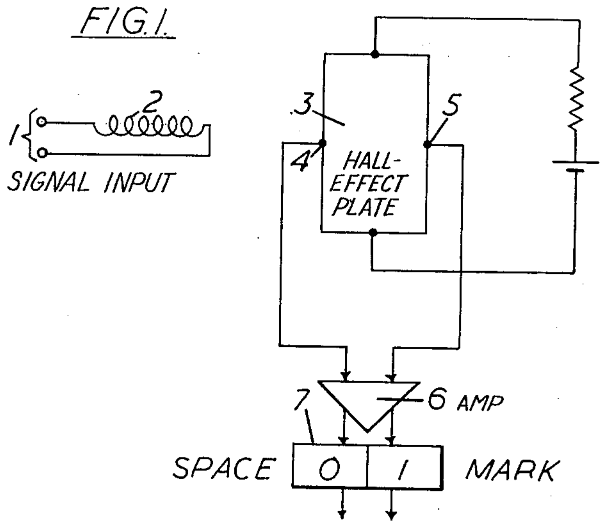
FIG. 1 represents schematically a first embodiment of the present invention.

In the arrangement of FIG. 1, incoming telegraph signals, received over the line 1 are applied to an energising coil of a magnetic element 2. This element cooperates with a plate 3 of a material such as indium antimonide, indium arsenide or indium arsenide phosphide, which exhibits the Hall effect. A direct current flows in this plate 3, being applied thereto via the upper and lower edges of the plate 3. The magnetic field which the element 2 can produce is always perpendicular to the plane of the plate 3, and hence also to the direction in which this current flows.

As is well known, if a magnetic field is applied to an electrical conductor which exhibits the Hall effect and in which an electrical current is flowing, an electrical potential is produced which is at right angles both to field and current.

In the device shown in FIG. 1, connections are made to the sides of the plate 3 not fed with current, and consequently when the magnetic element 2 is energised as a result of an incoming signal an electrical potential is produced between the points 4 and 5, the sense and magnitude of this potential being dependent on the sense and magnitude of the incoming signal which energised the magnetic element 2.

Since the potential so produced is of small size, it is amplified by a D.C. amplifier 6, which could be a single transistor amplifier, whose output feeds a binary quantizer 7. The D.C. amplifier 6 sets the quantizer 7 to its "0" (Space) or "1" (Mark) condition, dependent on the potential which is applied to it by the amplifier 6, this being dependent on the sense of the magnetic field applied to the Hall plate 3, which in turn is dependent on the polarity of the signal on line 1. The output of the quantizer 7 feeds local circuits, such as a teleprinter, repeater, or reperforator.

The Hall plate can be part of a device commercially available and known as a Hall multiplier, which consists of a plate of a material such as indium animonide which exhibits the Hall effect, having the two pairs of opposed terminals as shown in FIG. 1, and also the magnetic element. In one such commercially-available device, these elements are mounted in a container which resembles a vacuum envelope. This fits into a valve base to which are connected the current feed terminals, the output terminals, and the terminals of the magnetic element.

The quantizer used in the circuit of FIG. 1 should have a very small "back-lash," and may have the general form of an Eccles-Jordan bistable device, with its positive feed-back reduced to the lowest practicable value. This would entail highly stable amplification, and possibly necessitate the provision of stabilished power supplies.

Figure 2:
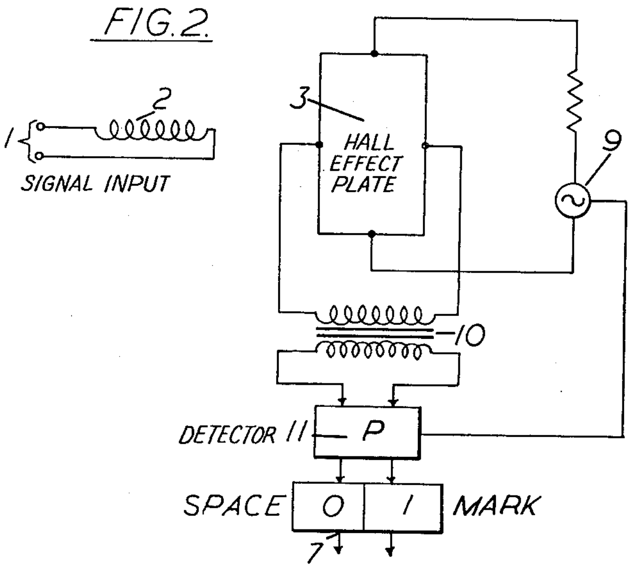
FIG. 2 is a schematic representation of a second embodiment of this invention.

The circuit of FIG. 2 shows another way to get a high output voltage: here the constant current supplied to the Hall plate 3 comes from a constant current A.C. source, and the output from the Hall plate is applied via a step-up transformer 10 to a detector 11. The ratio of the transformer can be relatively high, e.g. 1 to 100, and the resulting output will be an alternating voltage whose phase with respect to that of the source 9 is representative of the sense of the incoming signal, and whose magnitude is representative of that of the incoming signal.

The output of the detector 11, which in the case of double-current signals is a phase-sensitive detector, is applied to the quantizer 7 in the same way as in the circuit of FIG. 1.

These circuits are sufficiently fast to respond to line telegraph signals while being simple and economical. Further, they provide electrical isolation between the line input and the output terminals. In addition, they are not afflicted with troubles due to contact bounce, oxidation or erosion.

Figure 3:
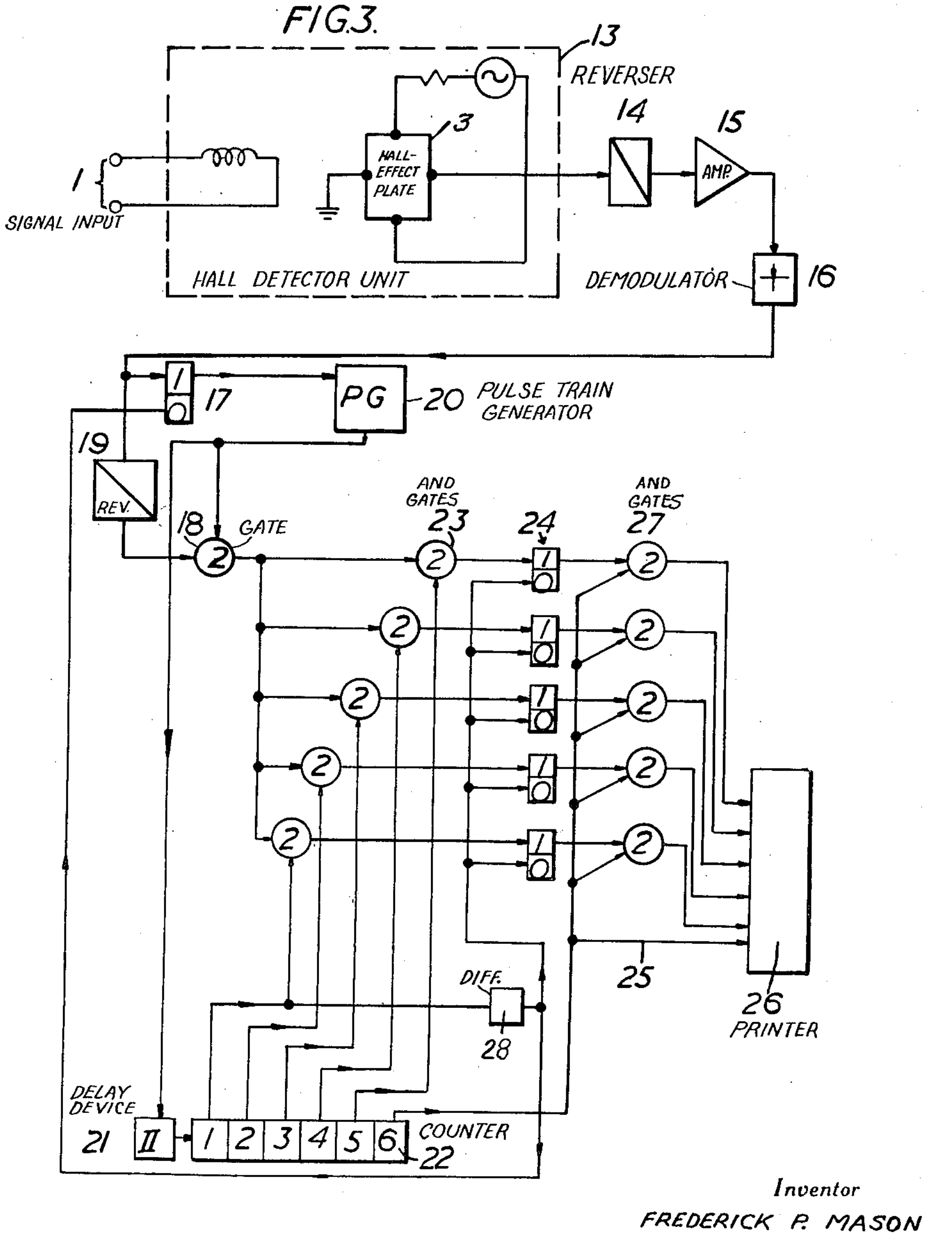
FIG. 3 is a telegraph signal receiving arrangement using the embodiment of the invention shown in FIG. 2.

In the telegraph receiving arrangement of FIG. 3, the elements shown inside the broken-line rectangle 13 are generally the same as FIG. 2, with the exception that one of the two output terminals is grounded so that an alternating potential is produced at the other output terminal when the magnet of the Hall multiplier is energised. The frequency of this alternating potential is (as in FIG. 2) high compared with the frequency of the signals to be received over the line 1. Under normal conditions of single-current working, the incoming telegraph line 1 is in the marking, or energised, condition, so that in the normal condition the Hall detector unit 13 gives an alternating output.

The output from the Hall detector unit 13 is applied to a reverser 14, this being a "logical inverter," i.e. a device which emits an output when it receives no input from unit 13, and emits no output when it receives an input from 13. Hence in the marking condition the reverser 14 gives no output. The output from the reverser 14 is applied via an amplifier 15 to a demodulator 16, whose direct current output is applied to the "1" side of a bistable device 17.

When a telegraph signal commences to arrive, its start element, which is a space, covers the A.C. input to the reverser 14 to be terminated, so that this device gives an output, which output causes, via amplifier 15 and demodulator 16, a potential to be applied to the bistable device 17, which is set to its "1" condition. The output from the demodulator 16 also controls an AND gate 18 via a further reverser 19, but, due to the reverser, gate 18 is closed at this stage. The energised "1" output of the device 17 starts a pulse train generator 20, which produces a train of six pulses the first five of which are so timed as to occur at or near the mid-points of the five permutable elements of a code combination, the sixth pulse being produced in the stop element. Such generators are, of course, well-known.

The pulses from the generator 20 are applied to one input of the gate 18, and also to the input of a delay device 21, which introduces a delay, whose purpose will be described later. The output from the delay device 21 feeds a six stage counter 22, whose first five outputs control a set of five AND gates such as 23, each of which has its other input connected to the output from the gate 18. These five AND gates control five bistable devices such as 24, one per permutable element, each of which is normally at 0.

After the start element, the five permutable elements are sampled one after the other, and each of them which is at mark causes an output to be applied to 14, and hence no output to 16, and consequently causes the second reverser 19 to give an output. At this point it should be noted that reverser 19 has to differ somewhat from the reverser 14 as it is a direct current device whereas the reverser 14 is an alternating current device. Thus the gate 18 receives an input for each element of a received combination which is in the marking condition, and is opened by the pulse generator 20 at the mid-point of all of the permutable elements.

The five gates such as 23 are opened one after the other by the counter 22, each opening of one of these gates occurring just after the opening of the gate 18. Hence the gates 23 and the counter together form a distributor which distributes the five premutable elements to the five bistable devices such as 24. Hence the permutable elements are successively sampled and the results of the samplings stored on the five bistable devices, a bistable device such as 24 being set to 1 for a mark element and being left at 0 for a space element.

It should be noted that the rest or standby condition of the counter is with its 1 output energised so that the result of the first sampling is offered via the corresponding gate to the lowermost one of the devices 24. The delayed pulse from the device 21 steps the counter 22 to its 2 condition, which stepping occurs after the two gates have had time to operate and set a bistable device. Hence the second gate of the five gates 23 is prepared from the counter 22.

Thus the code combination is received and stored in the temporary store formed by the five bistable devices 24, each mark element setting a device such as 24 to its 1 condition, and each sampling pulse causing (after the delay due to 21) the advance of the distributor ready to deal with the next element. When the counter reaches its sixth stage as a result of the five (delayed) sampling pulses, a start signal is applied via a lead 25 to a printer 26, and in addition a set of five AND gates such as 27 are all opened. The opening of these gates causes the code combination set up on the bistable devices such as 24 to be entered into the printer 26. The latter therefore operates in response to the code, either to record it in a more permanent way (e.g. on paper tape or a magnetic recording medium), or to decode and print the character, or to initiate a retransmission, as required.

The sixth and last pulse from the generator 20 steps the counter 22 back to its 1 condition, and the output from the 1 stage is applied to the first of the gates 23, and also applied to a differentiator 28. The output of this differentiator resets all six bistable devices to zero, so that the equipment has returned to its rest condition, in which it is ready to deal with the next received code combination.

Although the circuit of FIG. 3 uses the alternating current operated device similar to FIG. 2, it could, of course, use the device of FIG. 1. Finally, amplification (not shown) may be needed between line 1 and detector unit 13, or between detector unit 13 and the reverser 14.

It is to be understood that the foregoing description of specific examples of this invention is not to be considered as a limitation on its scope.

What I claim is:

1. An electrical telegraph receiving arrangement comprising:

(a) a Hall multiplier which includes a plate of material exhibiting the Hall effect and having energizing input terminals and output terminals, and a magnetizing coil having signal input terminals;

(b) a source of electrical energy; and (c) sampling means; said source of electrical energy being coupled to said energizing input terminals, and said sampling means being coupled to said Hall multiplier output terminals, whereby the application of input signals comprising spaces and marks as permutable elements causes two different respective electrical potential conditions to occur at said output terminals of said Hall multiplier, said sampling means being arranged to sample the output derived from said Hall multiplier at the central point of each permutable element of a received code combination.

2. An electrical telegraph-signal-receiving arrangement comprising:

(a) a Hall multiplier which includes a plate of material exhibiting the Hall effect and having energizing input terminals and output terminals, and a magnetizing coil having signal input terminals, said coil being arranged to receive telegraph signals comprising marks and spaces as permutable elements thereof;
(b) a source of electrical energy;
(c) a demodulator; and
(d) a sampling gate; said source of electrical energy comprising a source of alternating potentials whose frequency is high compared with the element repetition frequency of the telegraph signals to be received being coupled to said energizing input terminals to cause current to flow in said Hall-effect material, one of said output terminals being connected to a reference potential and the other to said demodulator to cause an alternating potential to appear on said output connection when the line is in the mark condition but not when the line is in the space condition, said sampling gate being coupled to the output from said demodulator and adapted to be opened at the mid-point of each permutable element of a code combination being received, so that the output from said sampling gate is at one direct-current potential when the line is at mark and at another direct-current potential when the line is at space.

3. An electronic relay arrangement comprising:
(a) a Hall multiplier which includes a plate of material exhibiting the Hall effect and having energizing input terminals and output terminals, and a magnetizing coil having signal input terminals;
(b) a source of electrical energy; and
(c) a bistable device; said source of electrical energy being coupled to said energizing input terminals to cause current to flow in said Hall-effect material, and said bistable device being coupled to said output terminals, whereby direct-current signals applied to said magnetizing-coil input terminals cause potential differences to occur at said output terminals, said potential differences in turn controlling said bistable device.

4. An electronic relay arrangement as in claim 3, wherein said source of electrical energy is a direct-current source, said electronic relay arrangement further including an amplifier interposed between said output terminals and said bistable device.

5. A relay arrangement as in claim 3, in which said source of electrical energy is a source of an alternating current whose frequency is high compared with the frequency of said input signals to be received, and in which said output terminals are coupled to a phase-sensitive detector whose output is coupled to said bistable device, the output of said phase sensitive detector being dependent on the relative phase of the potential produced at said output terminals by said input signal and said alternating current supply.

6. A relay arrangement as in claim 3, and in which one of said output terminals of said Hall effect member is connected to a reference potential while the other controls said bistable device.

7. An electrical telegraph signal receiving arrangement which comprises a Hall multiplier, a source of electrical energy, a set of bistable devices, one per permutable element of the signals to be received, and a distributor for connecting said Hall multiplier to successive ones of said bistable devices, the combination of said Hall multiplier, said source of electrical energy and one of said set of bistable devices being in accordance with claim 16 for each condition of said distributor connecting said Hall multiplier to successive ones of said bistable devices.

8. An arrangement as in claim 7, and in which the commencement of a telegraph code combination to be received causes the production of a train of pulses each of which opens a sampling gate in the connection from said Hall multiplier to said distributor for a period at the mid-point of each permutable element.

9. An arrangement as in claim 7, in which said distributor comprises a set of gates each connected between said sampling gate and a different one of said bistable devices, and a counter whose outputs are sequentially energised by the pulses of said train, such that each of said gates is opened for a period embracing one of the opening times of said sampling gate.

10. An arrangement as in claim 9, and in which the outputs of said bistable devices are connected through a set of normally-closed gates to an utilisation device, said normally-closed gates being opened simultaneously under control of said counter after the last of said samplings.

11. An arrangement as in claim 10, in which after said normally-closed gates are opened said counter returns to its rest condition, in which when said counter returns to rest, all elements of the circuit arrangement are restored to rest.

12. An arrangement as in claim 10, in which the electrical energy source is arranged to apply to said Hall effect member an alternating current whose frequency is high compared with the frequency of said received code elements, in which one of said output terminals of said Hall effect member is connected to a reference potential and the other is connected to said sampling means.

13. An arrangement as in claim 11, in which between the output terminals of the Hall multiplier there is coupled in cascade, a series of elements comprising a reverser, an amplifier, said demodulator and a further reverser, each said reverser producing a potential when it has no input potential and vice versa, and in which the output of said first reverser controls a pulse generator so that when a start element, which is a space element occurs the output so produced from said first reverser starts said pulse generator, which thereupon generates a succession of pulses for controlling said sampling gate.

14. An arrangement as in claim 13, and in which the output of said sampling gate is connected to a temporary store formed by a set of bistable devices via a distributor controlled by said counter.

No references cited.

DAVID G. REDINBAUGH, *Primary Examiner.*